(12) United States Patent
Wylie

(10) Patent No.: US 10,782,735 B2
(45) Date of Patent: *Sep. 22, 2020

(54) DOCKING STATION FOR TABLET DEVICE

(71) Applicant: Mobile Tech, Inc., Lake Oswego, OR (US)

(72) Inventor: Hunter Wylie, Sherwood, OR (US)

(73) Assignee: Mobile Tech, Inc., Hillsboro, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/265,678

(22) Filed: Feb. 1, 2019

(65) Prior Publication Data

US 2019/0163237 A1  May 30, 2019

Related U.S. Application Data

(63) Continuation of application No. 15/875,957, filed on Jan. 19, 2018, now Pat. No. 10,198,035, and a continuation of application No. 15/875,990, filed on Jan. 19, 2018, now Pat. No. 10,198,036, said application No. 15/875,957 is a continuation of application No. 15/667,436, filed on Aug. 2, 2017, now abandoned, which is a continuation of application No. 14/097,171, filed on Dec. 4, 2013, now Pat. No. 9,760,116.

(60) Provisional application No. 61/733,842, filed on Dec. 5, 2012.

(51) Int. Cl.
    *G06F 1/16* (2006.01)
(52) U.S. Cl.
    CPC .......... *G06F 1/1632* (2013.01); *G06F 1/1654* (2013.01)

(58) Field of Classification Search
    CPC ..... G06F 1/1632; G06F 1/1654; G06F 1/1656
    See application file for complete search history.

(56) References Cited

U.S. PATENT DOCUMENTS

| | | | |
|---|---|---|---|
| 883,335 | A | 3/1908 | O'Connor |
| 3,444,547 | A | 5/1969 | Surek |
| 3,612,462 | A | 10/1971 | Mooney et al. |
| 3,780,909 | A | 12/1973 | Callahan et al. |
| D244,857 | S | 6/1977 | Hayes |
| 4,075,878 | A | 2/1978 | Best |
| 4,117,465 | A | 9/1978 | Timblin |
| 4,335,931 | A | 6/1982 | Kinnear |
| 4,354,613 | A | 10/1982 | Desai et al. |
| 4,384,688 | A | 5/1983 | Smith |

(Continued)

FOREIGN PATENT DOCUMENTS

| | | |
|---|---|---|
| AT | 506665 A1 | 10/2009 |
| CA | 2465692 A1 | 11/2004 |

(Continued)

OTHER PUBLICATIONS

U.S. Appl. No. 15/667,436: Applicant Response to Pre-Exam Formalities Notice, dated Oct. 5, 2017, 11 pages.

(Continued)

*Primary Examiner* — Adrian S Wilson

(57) ABSTRACT

A docking station for a tablet device includes a security frame that is releasably connected to a pedestal. An upper head portion of the pedestal is rotatable through three degrees of freedom to allow for angular adjustment of the frame as it retains a tablet device. Electrical conductivity is maintained through the rotational connection.

20 Claims, 7 Drawing Sheets

(56) References Cited

U.S. PATENT DOCUMENTS

| | | |
|---|---|---|
| 4,590,337 A | 5/1986 | Engelmore |
| 4,714,184 A | 12/1987 | Young et al. |
| 4,772,878 A | 9/1988 | Kane |
| 4,898,493 A | 2/1990 | Blankenburg |
| 5,033,709 A | 7/1991 | Yuen |
| 5,072,213 A | 12/1991 | Close |
| 5,146,205 A | 9/1992 | Keifer et al. |
| 5,176,465 A | 1/1993 | Holsted |
| 5,187,744 A | 2/1993 | Richter |
| 5,230,016 A | 7/1993 | Yasuda |
| 5,246,183 A | 9/1993 | Leyden |
| 5,436,792 A | 7/1995 | Leman et al. |
| 5,457,745 A | 10/1995 | Wang |
| 5,459,637 A | 10/1995 | Ma et al. |
| 5,517,434 A | 5/1996 | Hanson et al. |
| 5,526,493 A | 6/1996 | Shu |
| 5,543,782 A | 8/1996 | Rothbaum et al. |
| 5,570,267 A | 10/1996 | Ma |
| 5,583,742 A | 12/1996 | Noda et al. |
| 5,586,002 A | 12/1996 | Notarianni |
| 5,615,258 A | 3/1997 | Ho |
| 5,685,436 A | 11/1997 | Davet |
| 5,751,548 A | 5/1998 | Hall et al. |
| 5,769,369 A | 6/1998 | Meinel |
| 5,847,924 A | 12/1998 | Youn |
| 5,861,807 A | 1/1999 | Leyden et al. |
| D409,018 S | 5/1999 | Deuschle |
| 5,903,645 A | 5/1999 | Tsay |
| 5,923,528 A | 7/1999 | Lee |
| 5,982,855 A | 11/1999 | Miyamoto |
| 6,039,496 A | 3/2000 | Bishop |
| 6,062,518 A | 5/2000 | Etue |
| D433,953 S | 11/2000 | Woznicki et al. |
| 6,151,218 A | 11/2000 | Pirdy et al. |
| 6,170,775 B1 | 1/2001 | Kovacik et al. |
| 6,236,435 B1 | 5/2001 | Gertz |
| D455,166 S | 4/2002 | Raad et al. |
| 6,380,855 B1 | 4/2002 | Ott |
| 6,386,906 B1 | 5/2002 | Burke |
| 6,400,560 B1 | 6/2002 | Chian |
| 6,476,717 B1 | 11/2002 | Gross et al. |
| 6,491,276 B1 | 12/2002 | Belliveau |
| 6,502,727 B1 | 1/2003 | Decoteau |
| 6,504,710 B2 | 1/2003 | Sutton et al. |
| 6,549,130 B1 | 4/2003 | Joao |
| 6,581,421 B2 | 6/2003 | Chmela et al. |
| 6,585,201 B1 | 7/2003 | Reed |
| 6,644,611 B1 | 11/2003 | Tai |
| 6,659,382 B2 | 12/2003 | Ryczek |
| 6,700,488 B1 | 3/2004 | Leyden et al. |
| 6,702,604 B1 | 3/2004 | Moscovitch |
| 6,714,983 B1 | 3/2004 | Koenck et al. |
| 6,731,212 B2 | 5/2004 | Hirose et al. |
| 6,748,707 B1 | 6/2004 | Buchalter et al. |
| 6,761,579 B2 | 7/2004 | Fort et al. |
| 6,773,172 B1 | 8/2004 | Johnson et al. |
| 6,781,825 B2 | 8/2004 | Shih et al. |
| 6,786,766 B1 | 9/2004 | Chopra |
| 6,799,994 B2 | 10/2004 | Burke |
| 6,831,560 B2 | 12/2004 | Gresset |
| 6,856,506 B2 | 2/2005 | Doherty et al. |
| 6,885,817 B2 | 4/2005 | Artonne et al. |
| 6,896,543 B2 | 5/2005 | Fort et al. |
| D508,916 S | 8/2005 | Lee |
| 6,935,883 B2 | 8/2005 | Oddsen, Jr. |
| 6,944,294 B2 | 9/2005 | Tsay |
| 6,946,961 B2 | 9/2005 | Frederiksen et al. |
| 6,952,343 B2 | 10/2005 | Sato |
| 6,961,401 B1 | 11/2005 | Nally et al. |
| 7,002,467 B2 | 2/2006 | Deconinck et al. |
| 7,015,596 B2 | 3/2006 | Pail |
| 7,032,872 B2 | 4/2006 | Sullivan |
| 7,052,296 B2 | 5/2006 | Yang et al. |
| 7,053,774 B2 | 5/2006 | Sedon et al. |
| 7,068,496 B2 | 6/2006 | Wong et al. |
| 7,081,822 B2 | 7/2006 | Leyden et al. |
| 7,085,491 B2 | 8/2006 | Chiang |
| 7,101,187 B1 | 9/2006 | Deconinck et al. |
| 7,135,972 B2 | 11/2006 | Bonato |
| 7,154,039 B1 | 12/2006 | Marszalek et al. |
| 7,209,038 B1 | 4/2007 | Deconinck et al. |
| D545,826 S | 7/2007 | Richter |
| 7,287,652 B2 | 10/2007 | Scholen et al. |
| D563,444 S | 3/2008 | Brickzin |
| D566,590 S | 4/2008 | Stevens et al. |
| 7,352,567 B2 | 4/2008 | Hotelling et al. |
| 7,385,522 B2 | 6/2008 | Belden, Jr. et al. |
| 7,387,003 B2 | 6/2008 | Marszalek et al. |
| 7,446,659 B2 | 11/2008 | Marsilio et al. |
| 7,515,408 B2 | 4/2009 | Bakker et al. |
| 7,522,047 B2 | 4/2009 | Belden, Jr. et al. |
| 7,611,112 B2 | 11/2009 | Lin |
| 7,626,500 B2 | 12/2009 | Belden, Jr. et al. |
| 7,650,230 B1 | 1/2010 | Laverick et al. |
| 7,652,873 B2 | 1/2010 | Lee |
| 7,654,399 B2 | 2/2010 | Scholen et al. |
| 7,658,363 B2 | 2/2010 | Meyer |
| 7,667,601 B2 | 2/2010 | Rabinowitz et al. |
| 7,669,816 B2 | 3/2010 | Crain et al. |
| 7,684,185 B2 | 3/2010 | Farrugia |
| 7,688,205 B2 | 3/2010 | Ott |
| 7,696,857 B2 | 4/2010 | Kritt et al. |
| 7,708,240 B2 | 5/2010 | Homer et al. |
| 7,710,266 B2 | 5/2010 | Belden, Jr. et al. |
| 7,712,661 B2 | 5/2010 | Thomas |
| 7,724,135 B2 | 5/2010 | Rapp et al. |
| 7,737,843 B2 | 6/2010 | Belden, Jr. et al. |
| 7,737,844 B2 | 6/2010 | Scott et al. |
| 7,737,845 B2 | 6/2010 | Fawcett et al. |
| 7,737,846 B2 | 6/2010 | Belden, Jr. et al. |
| 7,744,404 B1 | 6/2010 | Henson et al. |
| 7,836,623 B2 | 11/2010 | Wang et al. |
| 7,848,833 B2 | 12/2010 | Li et al. |
| 7,866,623 B2 | 1/2011 | Lampman et al. |
| 7,883,279 B2 | 2/2011 | Kendall |
| 7,909,641 B1 | 3/2011 | Henson et al. |
| D635,555 S | 4/2011 | Giles |
| D636,778 S | 4/2011 | Corsini et al. |
| D640,247 S | 6/2011 | Baumann et al. |
| 7,969,305 B2 | 6/2011 | Belden, Jr. et al. |
| D641,756 S | 7/2011 | Hsieh et al. |
| 7,971,845 B2 | 7/2011 | Galant |
| D643,056 S | 8/2011 | Zaliauskas et al. |
| 8,007,188 B2 | 8/2011 | Orf |
| 8,009,348 B2 | 8/2011 | Zehner et al. |
| D645,047 S | 9/2011 | Wike |
| D649,076 S | 11/2011 | Alexander |
| D650,783 S | 12/2011 | Ausfeld et al. |
| D650,784 S | 12/2011 | Feldstein et al. |
| 8,102,262 B2 | 1/2012 | Irmscher et al. |
| D661,646 S | 6/2012 | Son |
| 8,208,245 B2 | 6/2012 | Staats et al. |
| D663,972 S | 7/2012 | Alexander et al. |
| 8,230,992 B2 | 7/2012 | Law et al. |
| 8,251,325 B2 | 8/2012 | Molter |
| D668,660 S | 10/2012 | Norfolk |
| 8,282,060 B2 | 10/2012 | Fan |
| 8,289,131 B2 | 10/2012 | Cho et al. |
| D670,702 S | 11/2012 | Zhang et al. |
| D674,803 S | 1/2013 | Westrup |
| D678,287 S | 3/2013 | Hsu et al. |
| D678,293 S | 3/2013 | Meehan |
| D682,281 S | 5/2013 | Barnard et al. |
| 8,467,178 B2 | 6/2013 | Probst et al. |
| 8,488,832 B2 | 7/2013 | Leung |
| D687,440 S | 8/2013 | Shieh |
| 8,499,384 B2 | 8/2013 | Zerhusen |
| 8,531,829 B2 | 9/2013 | Oberpriller et al. |
| 8,558,688 B2 | 10/2013 | Henson et al. |
| 8,573,394 B2 | 11/2013 | Ahee et al. |
| D696,259 S | 12/2013 | Howarth et al. |
| 8,611,086 B1 | 12/2013 | Magnusson et al. |
| 8,616,508 B1 | 12/2013 | Coleman |
| 8,698,617 B2 | 4/2014 | Henson et al. |

(56) References Cited

U.S. PATENT DOCUMENTS

| | | | |
|---|---|---|---|
| 8,698,618 B2 | 4/2014 | Henson et al. | |
| 8,708,151 B2 | 4/2014 | Whitten et al. | |
| D704,194 S | 5/2014 | Young | |
| 8,749,194 B1 | 6/2014 | Kelsch et al. | |
| 8,749,963 B2 * | 6/2014 | Staats | G06F 1/1632 248/121 |
| 8,780,548 B2 | 7/2014 | Lee | |
| 8,800,763 B2 | 8/2014 | Hale | |
| 8,800,942 B2 | 8/2014 | Yu | |
| 8,807,849 B2 | 8/2014 | Apter | |
| 8,814,128 B2 | 8/2014 | Trinh et al. | |
| 8,847,759 B2 | 9/2014 | Bisesti et al. | |
| 8,851,565 B2 | 10/2014 | Hontz et al. | |
| D717,804 S | 11/2014 | Budge | |
| D718,316 S | 11/2014 | Veltz et al. | |
| 8,885,337 B2 | 11/2014 | Schanz et al. | |
| D719,144 S | 12/2014 | Eulette | |
| 8,913,380 B2 | 12/2014 | Enomoto et al. | |
| 8,955,807 B2 | 2/2015 | Alexander et al. | |
| 8,963,498 B2 | 2/2015 | Ferguson | |
| D725,119 S | 3/2015 | Gaylord | |
| D726,732 S | 4/2015 | Lay et al. | |
| 9,019,698 B2 | 4/2015 | Thiers | |
| D732,037 S | 6/2015 | Wylie | |
| 9,092,960 B2 | 7/2015 | Wheeler | |
| 9,097,380 B2 | 8/2015 | Wheeler | |
| 9,158,336 B2 | 10/2015 | Brewer et al. | |
| 9,220,358 B2 | 12/2015 | Wheeler et al. | |
| 9,229,494 B2 | 1/2016 | Rayner | |
| D748,634 S | 2/2016 | Hofer et al. | |
| 9,269,247 B2 | 2/2016 | Fawcett et al. | |
| 9,303,809 B2 | 4/2016 | Reynolds et al. | |
| D757,731 S | 5/2016 | Nguyen et al. | |
| 9,337,582 B2 | 5/2016 | Sato et al. | |
| 9,373,236 B2 | 6/2016 | Oehl et al. | |
| 9,396,631 B2 | 7/2016 | Fawcett et al. | |
| D766,247 S | 9/2016 | Burmester | |
| 9,478,110 B2 | 10/2016 | Fawcett et al. | |
| 9,576,452 B2 | 2/2017 | Fawcett et al. | |
| 9,641,539 B1 | 5/2017 | Votaw et al. | |
| 9,659,472 B2 | 5/2017 | Fawcett et al. | |
| 9,678,537 B2 | 6/2017 | Kupferstein | |
| D795,263 S | 8/2017 | Fujioka et al. | |
| D798,302 S | 9/2017 | Burmester | |
| 9,760,116 B2 * | 9/2017 | Wylie | G06F 1/1654 |
| 9,847,806 B1 | 12/2017 | Dickie | |
| 10,198,035 B2 * | 2/2019 | Wylie | G06F 1/1654 |
| 10,198,036 B2 * | 2/2019 | Wylie | G06F 1/1654 |
| 2001/0049222 A1 | 12/2001 | Fort et al. | |
| 2001/0055978 A1 | 12/2001 | Herrod et al. | |
| 2002/0044406 A1 | 4/2002 | Shimoda et al. | |
| 2002/0085343 A1 | 7/2002 | Wu et al. | |
| 2002/0162366 A1 | 11/2002 | Chmela et al. | |
| 2003/0007634 A1 | 1/2003 | Wang | |
| 2003/0010859 A1 | 1/2003 | Ryczek | |
| 2003/0128975 A1 | 7/2003 | Shevick | |
| 2003/0137584 A1 | 7/2003 | Norvell et al. | |
| 2003/0222149 A1 | 12/2003 | Solomon et al. | |
| 2003/0222848 A1 | 12/2003 | Solomon et al. | |
| 2003/0227746 A1 | 12/2003 | Sato | |
| 2003/0235029 A1 | 12/2003 | Doherty et al. | |
| 2004/0003150 A1 | 1/2004 | Deguchi | |
| 2004/0007721 A1 | 1/2004 | Forbes et al. | |
| 2004/0017652 A1 | 1/2004 | Billington et al. | |
| 2004/0077210 A1 | 4/2004 | Kollmann | |
| 2004/0113819 A1 | 6/2004 | Gauthey et al. | |
| 2004/0120112 A1 | 6/2004 | Mullen et al. | |
| 2004/0131086 A1 | 7/2004 | Alvarado et al. | |
| 2004/0177658 A1 | 9/2004 | Mitchell | |
| 2004/0190238 A1 | 9/2004 | Hubbard | |
| 2004/0201449 A1 | 10/2004 | Denison et al. | |
| 2004/0230725 A1 | 11/2004 | Chen et al. | |
| 2004/0233631 A1 | 11/2004 | Lord | |
| 2004/0257464 A1 | 12/2004 | Pandit et al. | |
| 2005/0014536 A1 | 1/2005 | Grady | |
| 2005/0047104 A1 | 3/2005 | Grunow et al. | |
| 2005/0073413 A1 | 4/2005 | Sedon et al. | |
| 2005/0088572 A1 | 4/2005 | Pandit et al. | |
| 2005/0165806 A1 | 7/2005 | Roatis et al. | |
| 2005/0206522 A1 | 9/2005 | Leyden et al. | |
| 2005/0215285 A1 | 9/2005 | Lin | |
| 2005/0255895 A1 | 11/2005 | Lee et al. | |
| 2006/0061958 A1 | 3/2006 | Solomon et al. | |
| 2006/0066438 A1 | 3/2006 | Altounian et al. | |
| 2006/0067036 A1 | 3/2006 | Lin et al. | |
| 2006/0148575 A1 | 7/2006 | Vitito | |
| 2007/0075914 A1 | 4/2007 | Bates | |
| 2007/0145210 A1 | 6/2007 | Fawcett et al. | |
| 2007/0152633 A1 | 7/2007 | Lee | |
| 2007/0159328 A1 | 7/2007 | Belden et al. | |
| 2007/0221726 A1 | 9/2007 | Thomas | |
| 2007/0229529 A1 | 10/2007 | Sekine et al. | |
| 2007/0247793 A1 | 10/2007 | Carnevali | |
| 2008/0104301 A1 | 5/2008 | Assouad et al. | |
| 2008/0168806 A1 | 7/2008 | Belden et al. | |
| 2008/0169923 A1 | 7/2008 | Belden et al. | |
| 2008/0222849 A1 | 9/2008 | Lavoie | |
| 2008/0288702 A1 | 11/2008 | Diab et al. | |
| 2009/0007390 A1 | 1/2009 | Tsang et al. | |
| 2009/0009936 A1 | 1/2009 | Neu et al. | |
| 2009/0033492 A1 | 2/2009 | Rapp et al. | |
| 2009/0034221 A1 | 2/2009 | Kerrigan | |
| 2009/0059481 A1 | 3/2009 | Taylor | |
| 2009/0079566 A1 | 3/2009 | Goldstein et al. | |
| 2009/0080684 A1 | 3/2009 | Groset et al. | |
| 2009/0114556 A1 | 5/2009 | Tai et al. | |
| 2009/0166483 A1 | 7/2009 | Marsilio et al. | |
| 2009/0173868 A1 | 7/2009 | Fawcett et al. | |
| 2009/0179127 A1 | 7/2009 | Pettey | |
| 2009/0183266 A1 | 7/2009 | Tan et al. | |
| 2009/0186583 A1 | 7/2009 | Seil et al. | |
| 2009/0225166 A1 | 9/2009 | Dronge | |
| 2009/0285234 A1 | 11/2009 | McConnell et al. | |
| 2009/0303692 A1 | 12/2009 | Terlizzi | |
| 2009/0328141 A1 | 12/2009 | Zhang et al. | |
| 2010/0012809 A1 | 1/2010 | Zeng et al. | |
| 2010/0075609 A1 | 3/2010 | Seil et al. | |
| 2010/0078343 A1 | 4/2010 | Hoellwarth et al. | |
| 2010/0081337 A1 | 4/2010 | Dorogusker et al. | |
| 2010/0081473 A1 | 4/2010 | Chatterjee et al. | |
| 2010/0083012 A1 | 4/2010 | Corbridge et al. | |
| 2010/0084532 A1 | 4/2010 | Nielsen et al. | |
| 2010/0124040 A1 | 5/2010 | Diebel et al. | |
| 2010/0127566 A1 | 5/2010 | Biester et al. | |
| 2010/0131691 A1 | 5/2010 | Chatterjee et al. | |
| 2010/0138581 A1 | 6/2010 | Bird et al. | |
| 2010/0172072 A1 | 7/2010 | Monaco | |
| 2010/0172081 A1 | 7/2010 | Tian et al. | |
| 2010/0195279 A1 | 8/2010 | Michael | |
| 2010/0215355 A1 | 8/2010 | Olien | |
| 2010/0326934 A1 | 12/2010 | Goldberg | |
| 2011/0047844 A1 | 3/2011 | Fawcett et al. | |
| 2011/0068919 A1 | 3/2011 | Rapp et al. | |
| 2011/0114804 A1 | 5/2011 | Liu et al. | |
| 2011/0187531 A1 | 8/2011 | Oehl et al. | |
| 2011/0195786 A1 | 8/2011 | Wells | |
| 2011/0254661 A1 | 10/2011 | Fawcett et al. | |
| 2011/0278885 A1 | 11/2011 | Procter et al. | |
| 2011/0283754 A1 | 11/2011 | Ezzo et al. | |
| 2011/0303816 A1 | 12/2011 | Horvath et al. | |
| 2011/0309934 A1 | 12/2011 | Henson et al. | |
| 2012/0026119 A1 | 2/2012 | Judy et al. | |
| 2012/0033375 A1 | 2/2012 | Madonna et al. | |
| 2012/0037783 A1 | 2/2012 | Alexander et al. | |
| 2012/0043247 A1 | 2/2012 | Westrup | |
| 2012/0043451 A1 | 2/2012 | Alexander et al. | |
| 2012/0155004 A1 | 6/2012 | Yukawa et al. | |
| 2012/0170194 A1 | 7/2012 | Lord et al. | |
| 2012/0175474 A1 | 7/2012 | Barnard et al. | |
| 2012/0182680 A1 | 7/2012 | Wetzel et al. | |
| 2012/0188689 A1 * | 7/2012 | Leung | G06F 1/1632 361/679.01 |
| 2012/0189156 A1 | 7/2012 | Leung | |
| 2012/0193496 A1 | 8/2012 | Li | |

(56) References Cited

U.S. PATENT DOCUMENTS

| | | |
|---|---|---|
| 2012/0205326 A1 | 8/2012 | Richter et al. |
| 2012/0217371 A1 | 8/2012 | Abdollahzadeh et al. |
| 2012/0234055 A1 | 9/2012 | Bland, III et al. |
| 2012/0280810 A1 | 11/2012 | Wheeler |
| 2012/0286118 A1 | 11/2012 | Richards |
| 2012/0293924 A1 | 11/2012 | Dolci et al. |
| 2012/0303476 A1 | 11/2012 | Krzyzanowski et al. |
| 2012/0303851 A1 | 11/2012 | Tseng et al. |
| 2013/0026322 A1 | 1/2013 | Wheeler et al. |
| 2013/0026332 A1 | 1/2013 | Liu |
| 2013/0043369 A1 | 2/2013 | Wheeler |
| 2013/0058023 A1 | 3/2013 | Supran et al. |
| 2013/0107126 A1 | 5/2013 | Nonomura et al. |
| 2013/0107449 A1 | 5/2013 | Su et al. |
| 2013/0161054 A1 | 6/2013 | Allison et al. |
| 2013/0168527 A1 | 7/2013 | Wheeler et al. |
| 2013/0238516 A1 | 9/2013 | Moock et al. |
| 2013/0268316 A1 | 10/2013 | Moock et al. |
| 2013/0346661 A1 | 12/2013 | Hasenei |
| 2014/0058023 A1 | 2/2014 | Wan et al. |
| 2014/0098491 A1 | 4/2014 | Wang |
| 2014/0118930 A1* | 5/2014 | Sedon .............. E05B 73/0082 361/679.56 |
| 2014/0141655 A1 | 5/2014 | Do |
| 2014/0159898 A1 | 6/2014 | Wheeler et al. |
| 2014/0168884 A1 | 6/2014 | Wylie |
| 2014/0265765 A1 | 9/2014 | Khodapanah et al. |
| 2014/0321048 A1 | 10/2014 | Kupferstein |
| 2014/0328020 A1 | 11/2014 | Galant |
| 2014/0355200 A1 | 12/2014 | Thiers |
| 2014/0380442 A1 | 12/2014 | Addepalli et al. |
| 2015/0048625 A1 | 2/2015 | Weusten et al. |
| 2015/0070832 A1 | 3/2015 | Schneider et al. |
| 2015/0156900 A1 | 6/2015 | Yeh et al. |
| 2015/0185774 A1 | 7/2015 | Vroom |
| 2015/0186685 A1 | 7/2015 | Vroom et al. |
| 2015/0201723 A1 | 7/2015 | Rayner et al. |
| 2015/0212590 A1 | 7/2015 | Feldstein et al. |
| 2016/0042620 A1 | 2/2016 | Dandie et al. |
| 2016/0135560 A1 | 5/2016 | Yeh |
| 2016/0239796 A1 | 8/2016 | Grant et al. |
| 2017/0032636 A1 | 2/2017 | Henson et al. |
| 2017/0193780 A1 | 7/2017 | Moock et al. |
| 2017/0223167 A1 | 8/2017 | Zouaoui et al. |
| 2018/0017992 A1 | 1/2018 | Wylie |
| 2018/0032104 A1 | 2/2018 | Schatz et al. |
| 2018/0143664 A1 | 5/2018 | Wylie |
| 2018/0143665 A1 | 5/2018 | Wylie |

FOREIGN PATENT DOCUMENTS

| | | |
|---|---|---|
| CA | 2802845 A1 | 3/2012 |
| CN | 103098104 A | 5/2013 |
| DE | 202009013722 U1 | 1/2011 |
| EP | 0745747 A1 | 12/1996 |
| EP | 1575249 A2 | 9/2005 |
| EP | 2619737 A1 | 7/2013 |
| ES | 1058183 U | 11/2004 |
| FR | 2595227 A1 | 9/1987 |
| FR | 2768906 A1 | 4/1999 |
| FR | 2868459 A1 | 10/2005 |
| FR | 3002125 A1 | 8/2014 |
| GB | 2440600 A | 2/2008 |
| JP | H0573857 U | 10/1993 |
| JP | H0668913 A | 3/1994 |
| JP | 1997-259368 | 10/1997 |
| JP | 3100287 B2 | 10/2000 |
| JP | 2013529141 | 5/2011 |
| TW | 103115313 A | 11/2015 |
| WO | 1997031347 A1 | 8/1997 |
| WO | 2004038670 A1 | 5/2004 |
| WO | 2012039794 A1 | 3/2012 |
| WO | 2012069816 A1 | 5/2012 |
| WO | 2012151130 A2 | 11/2012 |
| WO | 2013015855 | 1/2013 |
| WO | 2013068036 A1 | 5/2013 |
| WO | 2013134484 A1 | 9/2013 |
| WO | 2014019072 A1 | 2/2014 |
| WO | 2014107184 A1 | 7/2014 |
| WO | 2014134718 A1 | 9/2014 |
| WO | 2015051840 A1 | 4/2015 |
| WO | 2015050710 A3 | 5/2015 |
| WO | 2015184993 A1 | 12/2015 |

OTHER PUBLICATIONS

U.S. Appl. No. 15/667,436, filed Aug. 10, 2017, 3 pages.
U.S. Appl. No. 15/667,436, filed Aug. 2, 2017, 25 pages.
U.S. Appl. No. 15/667,436: Notice to File Missing Parts, dated Aug. 10, 2017, 2 pages.
U.S. Appl. No. 15/875,957, filed Jan. 19, 2018, 30 pages.
U.S. Appl. No. 15/875,957, filed Feb. 15, 2018, 3 pages.
U.S. Appl. No. 15/875,957: Office of Petitions Decision, Feb. 21, 2018, 2 pages.
U.S. Appl. No. 15/875,990, filed Jan. 19, 2018, 33 pages.
U.S. Appl. No. 15/875,990, filed Feb. 14, 2018, 3 pages.
U.S. Appl. No. 15/659,556: Non-Final Rejection, dated Jan. 24, 2018, 22 pages.
U.S. Appl. No. 15/659,556: Notice of Publication, dated Feb. 1, 2018, 1 page.
U.S. Appl. No. 15/659,556, filed Jul. 25, 2017, 62 pages.
U.S. Appl. No. 15/659,556, filed Aug. 2, 2017, 3 pages.
PCT/US17/44230: Initial publication with ISR, Feb. 1, 2018, 46 pages.
PCT/US17/44230: Written Opinion of the International Search Authority, dated Feb. 1, 2018, 7 pages.
U.S. Appl. No. 15/600,642, filed May 19, 2017, 30 pages.
U.S. Appl. No. 15/600,642, filed May 31, 2017, 3 pages.
U.S. Appl. No. 29/415,938: prosecution history.
16206866.2: app as filed.
U.S. Appl. No. 62/323,466: app as filed.
U.S. Appl. No. 62/323,511: app as filed.
U.S. Appl. No. 15/488,370: app as filed.
U.S. Appl. No. 15/488,379: app as filed.
PCT/US2017/027798: app as filed.
PCT/US2017/027801: app as filed.
U.S. Appl. No. 29/605,579: app as filed.
U.S. Appl. No. 15/488,373: app as filed.
U.S. Appl. No. 15/488,383: app as filed.
U.S. Appl. No. 29/605,580: app as filed.
U.S. Appl. No. 29/605,581: app as filed.
U.S. Appl. No. 29/605,791: app as filed.
U.S. Appl. No. 29/605,793: app as filed.
U.S. Appl. No. 29/605,583: app as filed.
U.S. Appl. No. 12/351,837: app as filed.
Excerpt from Bruce Schneier, Applied Cryptology: Protocols, Algorithms, and Source Code in C, 1994, 14 pages.
International Search Report for PCT/US2011/037235 dated Oct. 21, 2011.
MTI 2008 PowerPoint, "Vanguard Program" (Exhibit 1005 of Declaration of Mike Cook), pp. 1-9.
Office Action for U.S. Appl. No. 15/667,436 dated Feb. 22, 2018.
Propelinteractive, "Freedom Universal 2 Animation_003.wmv", YouTube Video https://www.youtube.com/watch?v=_odGNnQv0BQ &t=1s, published on Feb. 16, 2010 (see sample screenshots, pp. 1-24).
Propelinteractive, "Installing LP3 Old Version", YouTube Video https://www.youtube.com/watch?v=FRUaOFWiDRw&t=1s, published on Jun. 28, 2010 (see sample screenshots, pp. 1-9).
Propelinteractive, "MTI LP3 Product Mounting", YouTube Video https://www.youtube.com/watch?v=KX4TEuj1jCI , published on Jun. 23, 2010 (see sample screenshots, pp. 1-11).
Protex International Corp., "Instructions for PowerPro Detangler", 2005, 1 page.
Protex International Corp., "Instructions for PowerPro Sensor Head Cameras and Camcorders (Power and Security)", 2007, pp. 1-9.
Protex International Corp., "PowerPro System", 2006, pp. 1-2.

(56) References Cited

OTHER PUBLICATIONS

Retailgeek, "Virtual Tour of MTI Retail Innovation Center in 2009," YouTube Video https://www.youtube.com/watch?v=-wUvcDAmhj0, published on Aug. 2, 2010 (see transcript and sample screenshots, pp. 1-20).
Reuters, "MTI Begins Shipping FreedomTM Universal 2.0 Merchandising Solution", Oct. 1, 2008, pp. 1-3.
U.S. Appl. No. 61/607,802, filed Mar. 7, 2012.
U.S. Appl. No. 61/620,621, filed Apr. 5, 2012.
U.S. Appl. No. 61/774,870, filed Mar. 8, 2013.
U.S. Appl. No. 61/884,098, filed Sep. 29, 2013.
"35 mm Camera Display", Walmart Publication, 1995, 5 pages.
"Declaration of Mike Cook", *Vanguard Products Group, Inc.* v. *Merchandising Technologies, Inc.*, Case No. 3:10-cv-392-BR, U.S. District Court for the District of Oregon, Oct. 20, 2010, pp. 1-7.
"Declaration of Thaine Allison in Support of Patent Owner's Reply to Petitioner's Opposition to Patent Owner's Motion to Amend", Inter Partes Review of U.S. Pat. No. 7,909,641, Case 1PR2013-00122, Feb. 5, 2014, pp. 1-13.
"Deposition of Thaine Allison, III", Inter Partes Review of U.S. Pat. No. 7,909,641, Case IPR2013-00122, Feb. 24, 2014, pp. 1-198.
"MTI Freedom Universal 2.0 Product Manual", Dec. 2008, pp. 1-21.
"Reasons for Substantial New Question of Patentability and Supplemental Examination Certificate", Inter Partes Review of U.S. Pat. No. 7,909,641, Case IPR2013-00122, Jan. 30, 2013, pp. 1-12.
U.S. Appl. No. 29/604,812, filed May 19, 2017, 29 pages.
U.S. Appl. No. 29/604,812, filed May 23, 2017, 3 pages.
U.S. Appl. No. 29/604,812, filed Nov. 27, 2017, 3 pages.
U.S. Appl. No. 29/604,812: Requirement for Restriction/Election, dated Mar. 19, 2018, 7 pages.
U.S. Appl. No. 15/367,028: Amendment/Req. Reconsideration-After Non-Final Reject, dated Jan. 30, 2018, 14 pages.
U.S. Appl. No. 15/367,028, filed Nov. 22, 2017, 3 pages.
U.S. Appl. No. 15/367,028: Application Data Sheet to update/correct info, filed Nov. 21, 2017, 7 pages.
U.S. Appl. No. 15/367,028: Non-Final Rejection, dated Oct. 30, 2017, 12 pages.
U.S. Appl. No. 15/367,028: Notice to File Missing Parts, dated Dec. 13, 2016, 3 pages.
U.S. Appl. No. 15/367,028: Applicant Response to Pre-Exam Formalities Notice, dated Feb. 13, 2017, 12 pages.
U.S. Appl. No. 15/367,028, filed Dec. 1, 2016, 113 pages.
U.S. Appl. No. 15/367,028, filed Feb. 28, 2017, 3 pages.
U.S. Appl. No. 15/367,028, filed Dec. 13, 2016, 3 pages.
U.S. Appl. No. 15/367,028, filed Dec. 28, 2016, 3 pages.
U.S. Appl. No. 15/367,028: Notice of Publication, dated Jun. 8, 2017, 1 page.
U.S. Appl. No. 15/367,028: Request for Corrected Filing Receipt, Dec. 22, 2016, 7 pages.
PCT/US16/64863 / W02017/096330. Initial Publication without ISR, Jun. 8, 2017.
PCT/US16/64863 / W02017/096330: International Search Report, dated Oct. 20, 2017, 5 pages.
U.S. Appl. No. 15/656,520: Applicant Response to Pre-Exam Formalities, dated Sep. 25, 2017, 9 pages.
U.S. Appl. No. 15/656,520, filed Jul. 28, 2017, 3 pages.
U.S. Appl. No. 15/656,520, filed Sep. 26, 2017, 3 pages.
U.S. Appl. No. 15/656,520: Non-Final Rejection, dated Nov. 27, 2017, 11 pages.
U.S. Appl. No. 15/656,520: Notice of Publication, dated Jan. 4, 2018, 1 page.
U.S. Appl. No. 15/656,520: Application as filed and Preliminary Amendment, dated Jul. 21, 2017, 120 pages.
U.S. Appl. No. 14,097,171: Issue Notification, dated Aug. 23, 2017, 1 page.
U.S. Appl. No. 14,097,171: Amendment/Req. Reconsideration-After Non-Final Reject, dated Jul. 1, 2015, 7 pages.
U.S. Appl. No. 14,097,171: Amendment/Req. Reconsideration-After Non-Final Reject, dated Aug. 17, 2016, 7 pages.
U.S. Appl. No. 14,097,171: Applicant Response to Pre-Exam Formalities Notice, dated Feb. 24, 2014, 9 pages.
U.S. Appl. No. 14,097,171, filed Dec. 4, 2013, 23 pages.
U.S. Appl. No. 14,097,171, filed Mar. 11, 2014, 3 pages.
U.S. Appl. No. 14,097,171, filed Aug. 2, 2017, 3 pages.
U.S. Appl. No. 14,097,171, filed Dec. 23, 2013, 3 pages.
U.S. Appl. No. 14,097,171: Final Rejection, dated Sep. 17, 2015, 9 pages.
U.S. Appl. No. 14,097,171: Final Rejection, dated Nov. 10, 2016, 14 pages.
U.S. Appl. No. 14,097,171: Issue Fee Payment, dated Aug. 2, 2017, 1 page.
U.S. Appl. No. 14,097,171: Non-Final Rejection, dated Jan. 2, 2015, 6 pages.
U.S. Appl. No. 14,097,171: Non-Final Rejection, dated Mar. 17, 2016, 10 pages.
U.S. Appl. No. 14,097,171: Notice of Allowance and Fees Due, dated May 2, 2017, 11 pages.
U.S. Appl. No. 14,097,171: Notice of Publication, dated Jun. 19, 2014, 1 page.
U.S. Appl. No. 14,097,171: Notice to File Missing Parts, Dec. 23, 2013, 2 pages.
U.S. Appl. No. 14,097,171: RCE and Amendments, dated Feb. 17, 2016, 11 pages.
U.S. Appl. No. 14,097,171: RCE and Amendments, dated Apr. 10, 2017, 18 pages.
U.S. Appl. No. 15/667,436: Non-Final Rejection, dated Feb. 22, 2018, 9 pages.
U.S. Appl. No. 15/667,436: Notice of Publication, dated Jan. 18, 2018, 1 page.
Unicam Europe, "Freedom Lp3 Apr. 17, 2009", SlideShare Presentation https://www.slideshare.net/Borfu/freedom-p3-41709, published on Jul. 28, 2009 (pp. 1-9).
U.S. Appl. No. 14/845,146: prosecution history.
Prosecution History for U.S. Appl. No. 14/097,171, now U.S. Pat. No. 9,760,116, filed Dec. 4, 2013.
Prosecution History for U.S. Appl. No. 15/667,436, filed Aug. 2, 2017, now abandoned.
Prosecution History for U.S. Appl. No. 15/875,957, now U.S. Pat. No. 10,198,035, filed Jan. 19, 2018.
Prosecution History for U.S. Appl. No. 15/875,990, now U.S. Pat. No. 10,198,036, filed Jan. 19, 2018.

* cited by examiner

DOCKING STATION FOR TABLET DEVICE

CROSS-REFERENCE AND PRIORITY CLAIM TO RELATED PATENT APPLICATIONS

This application is a continuation of and claims priority under 35 USC 120 to U.S. patent application Ser. No. 15/875,957, filed Jan. 19, 2018, entitled "DOCKING STATION FOR TABLET DEVICE", now U.S. Pat. No. 10,198,035, which is a continuation of and claims priority under 35 USC 120 to U.S. patent application Ser. No. 15/667,436, filed Aug. 2, 2017, entitled "DOCKING STATION FOR TABLET DEVICE", which is a continuation of U.S. patent application Ser. No. 14/097,171, filed Dec. 4, 2013, now U.S. Pat. No. 9,760,116, entitled "DOCKING STATION FOR TABLET DEVICE", which claims priority under 35 USC 119 to U.S. Provisional Application Ser. No. 61/733,842, filed Dec. 5, 2012, and entitled "DOCKING STATION FOR TABLET DEVICE", the entire content of each of which is incorporated herein by reference.

This application is also a continuation of and claims priority under 35 USC 120 to U.S. patent application Ser. No. 15/875,990, filed Jan. 19, 2018, entitled "DOCKING STATION FOR TABLET DEVICE", now U.S. Pat. No. 10,198,036, which is a continuation of and claims priority under 35 USC 120 to U.S. patent application Ser. No. 15/667,436, filed Aug. 2, 2017, entitled "DOCKING STATION FOR TABLET DEVICE", which is a continuation of U.S. patent application Ser. No. 14/097,171, filed Dec. 4, 2013, now U.S. Pat. No. 9,760,116, entitled "DOCKING STATION FOR TABLET DEVICE", which claims priority under 35 USC 119 to U.S. Provisional Application Ser. No. 61/733,842, filed Dec. 5, 2012, and entitled "DOCKING STATION FOR TABLET DEVICE", the entire content of each of which is incorporated herein by reference.

TECHNICAL FIELD

The design disclosed below relates to a docking station for a tablet device. More particularly, the design relates to a docking station that allows the tablet device to be used as a work station, or alternatively, the tablet device can be undocked and used remotely from the work station position.

BACKGROUND OF THE INVENTION

This disclosure claims priority on provisional application filing 61/733,842. The contents of the provisional are incorporated here by reference.

In general terms, electronic tablet devices (or "tablets") have evolved such that they are now performing many of the functions that were formerly performed by laptop or desktop computers. The processing capability of tablets now allow them to perform standard business functions.

Because of their size and portability, one of the problems associated with the use of tablets in a business setting relates to physical security and/or theft of the device itself. The design disclosed here addresses these problems.

SUMMARY OF THE INVENTION

The following is a summary of the various improvements disclosed in this document.

The disclosed design is a docking station that is primarily intended to be used in connection with tablet devices. Tablet devices are well-known electronic devices. They are sometimes called electronic tablets, tablet computers, or just "tablets."

The docking station disclosed here includes a security frame portion for retaining the tablet. The security frame portion surrounds the tablet and provides a framework for carrying the tablet from place-to-place while retained within the security frame.

The frame portion carries or has a first universal adaptor that electrically couples the tablet to the frame portion. The universal adaptor is designed so that it may electrically couple to the different kinds of connection ports that relate to different brands of tablets. As a person skilled in the art would know, these connection ports provide a means for transmitting power and data to and from the tablet.

The docking station also includes a pedestal, or pedestal portion, that normally rests on a workstation surface or the like. The pedestal has a connecting head portion that provides a means for releasably connecting the above-described frame portion to the pedestal portion. The head portion carries a second universal adaptor for electrically coupling the head portion to the first universal adaptor on the frame portion, previously described, when the frame portion is connected or "docked" to the pedestal portion.

Another feature of the design involves a rotational connection between the head portion of the pedestal and a lower base portion of the pedestal. The rotational connection enables three degrees of angular orientation or adjustment of the head portion relative to the base portion. This, in turn, allows for adjustment of the view angle of the tablet when it is docked.

The base portion is connectable to or provides electrical connection ports for at least one electrical signal, although preferably, it includes ports for numerous kinds of electrical connections that normally involve power and data. A conductor pathway is provided through the base member to the universal adaptor carried by the head portion by crossing the rotational connection between the head portion and the base portion. This allows electrical connectivity to be maintained regardless of the angular portion of the frame (and tablet) relative to the pedestal.

Another feature of the design involves locking the frame to the pedestal. While this may be accomplished in different ways, the design disclosed here includes an electronic lock for additional security The foregoing summary will become better understood upon review of the attached drawings which are to be taken in conjunction with the written description set forth below.

BRIEF DESCRIPTION OF THE DRAWINGS

In the drawings, like reference numerals and letters refer to like parts throughout the various views, and wherein.

DETAILED DESCRIPTION

Figure 1:
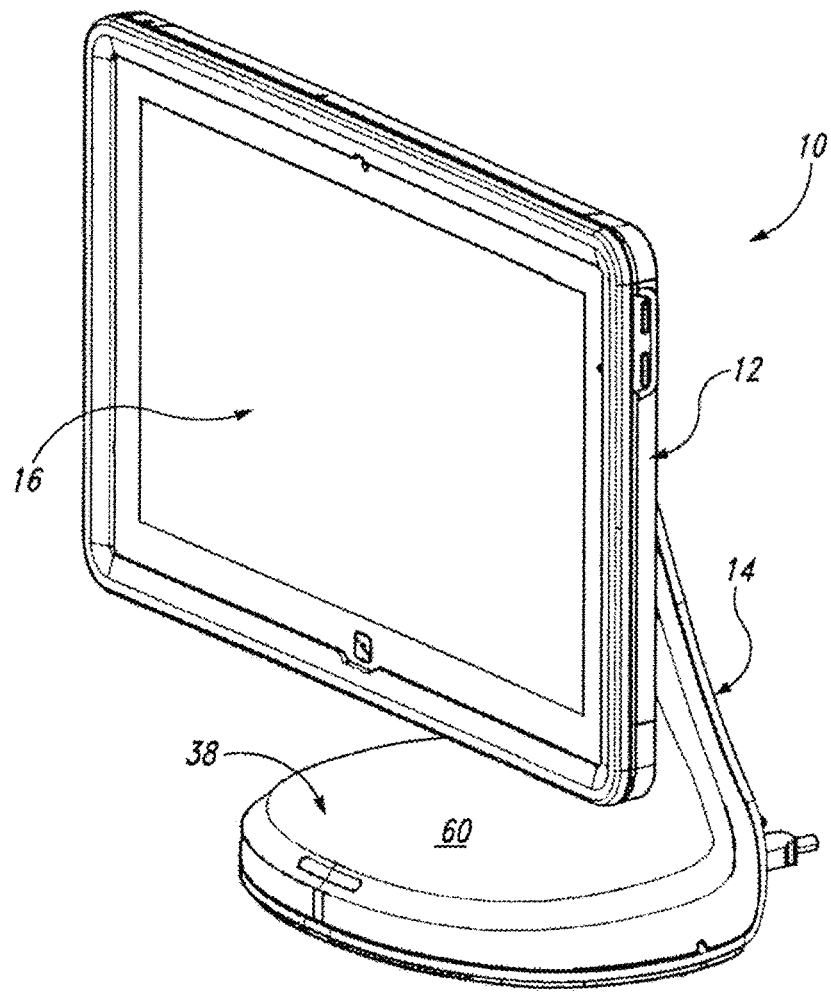
FIG. 1 is a perspective view of a docking station constructed in accordance with the patent claims.
Figure 2:
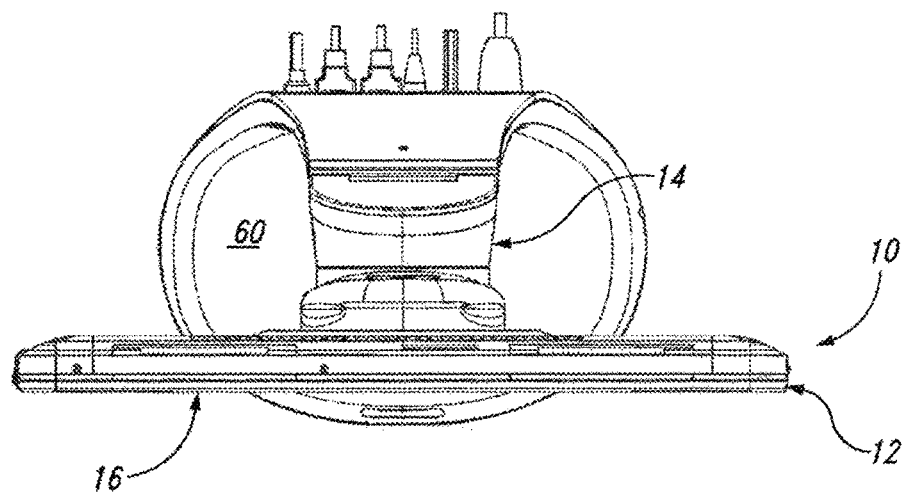
FIG. 2 is a top view of the docking station.
Figure 3:
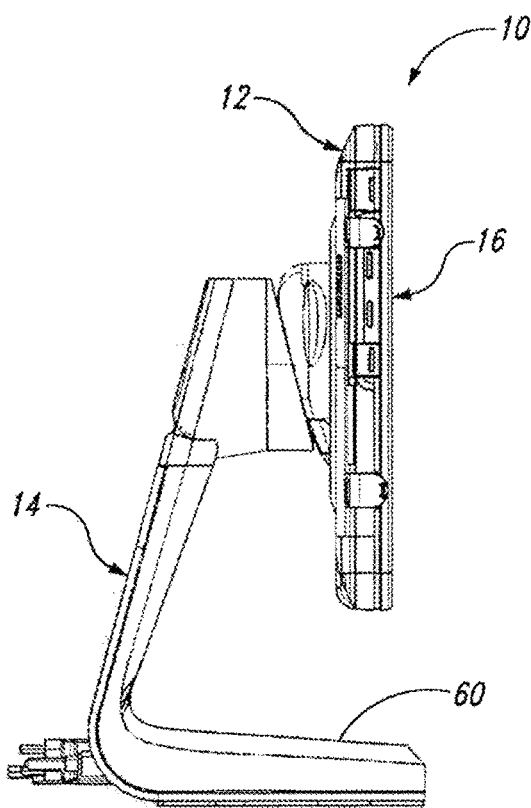
FIG. 3 is a side view of the docking station.

Referring now to the drawings, and first to FIG. 1, indicated generally at 10 is a docking station in accordance with the present disclosure. The docking station 10 includes a security frame portion, indicated generally at 12, and a pedestal portion, indicated generally at 14.

The pedestal portion 14 surrounds and captures a tablet device 16. The outline of the tablet's screen is indicated by dashed line 18 in FIG. 1. The activating button on the tablet is indicated at 20.

Although the frame 12 is illustrated here as surrounding and capturing the tablet 16, it is to be understood that there could be other physical embodiments that perform the same function without completely surrounding the entire or full periphery of the tablet 16.

Figure 4:
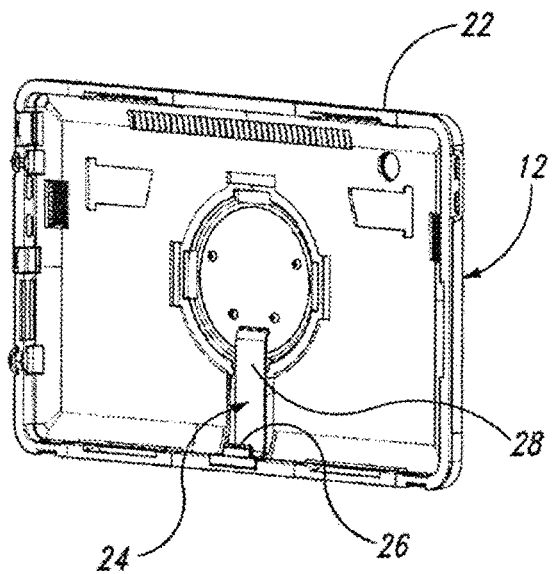
FIG. 4 is a perspective view of a security frame portion of the docking station that holds or retains a tablet.

Referring now to FIGS. 4-7, further details of the frame portion 12 will now be described. FIG. 4 illustrates the frame portion 12 without the tablet inside (looking at the front). As can be seen from the Fig., it has a rectangular peripheral edge 22 that captures the edge of the tablet 16. Depending on the configuration, the edge structure 22 may be provided with built-in openings for different kinds of tablet access ports (for the purpose of pushing buttons on the tablet or accessing jacks, etc.).

Figure 6:
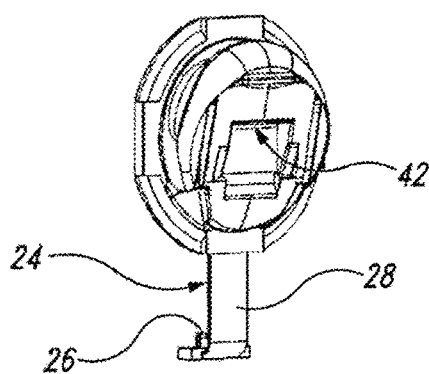
FIG. 6 is a perspective view of an adaptor portion of the security frame illustrated in FIG. 4.
Figure 7:
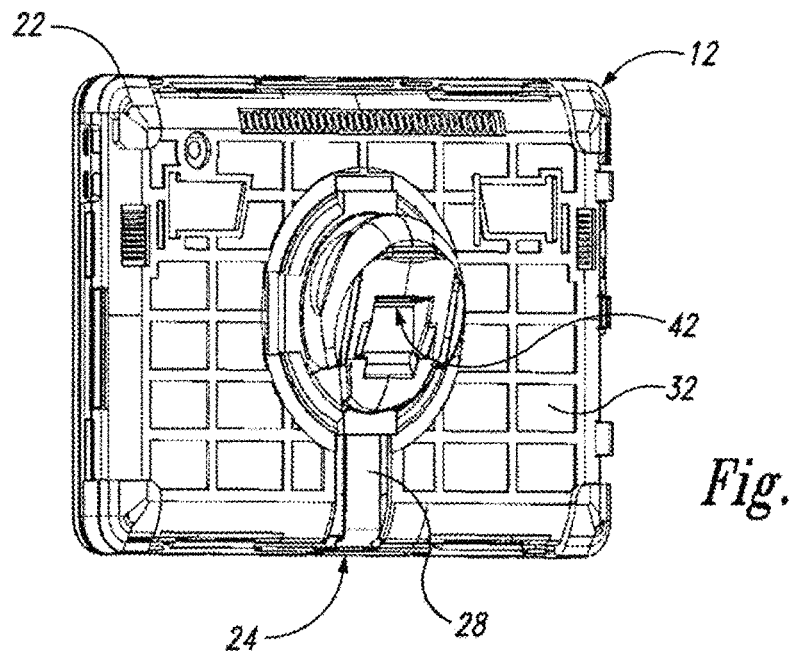
FIG. 7 is a perspective view of the back-side of the security frame portion illustrated in FIG. 4.

The frame 12 carries a first electrical adaptor, indicated generally at 24 in FIGS. 4 and 6, that provides the needed electrical connection to the tablet 16. The adaptor 24 is "universal" in that it has a universal connector fitting 26 that would be shaped to fit a variety of different kinds of tablets (tablet variations are dictated by brand). Typically, and as a person skilled in the art would understand, the universal adaptor 24 provides power and data connections for the tablet—i.e., power for the device's battery, etc., and data for network or Internet connections, if hard-wired connections are desired. The conductors for the universal adaptor 24 run through a stem portion 28 (see FIG. 6 of the universal adaptor 24).

Figure 5:
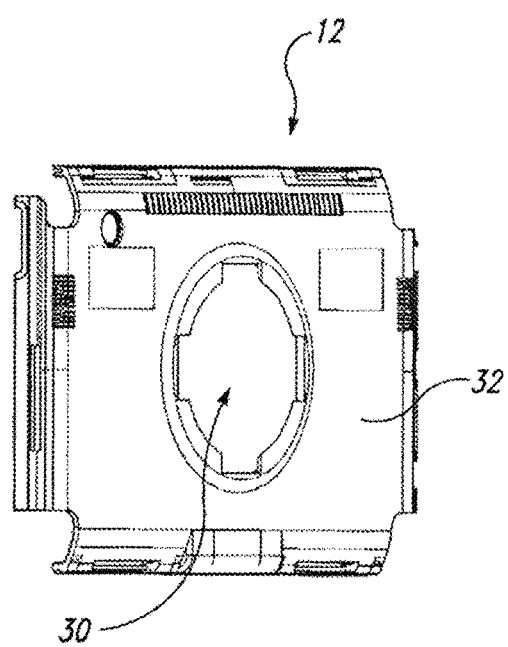
FIG. 5 is a perspective view of a back-side part of the security frame portion illustrated in FIG. 4.

FIG. 5 illustrates the back-side or back plate 30 of the frame portion 12. It is surrounded by the edge 22 previously described. As is shown in FIG. 5, it has an opening 30 for capturing the universal adaptor 24 previously described. When all of these components are assembled together, it produces the frame portion of the docking station indicated in FIG. 4 (the front side) and FIG. 7 (the back side).

Figure 8:
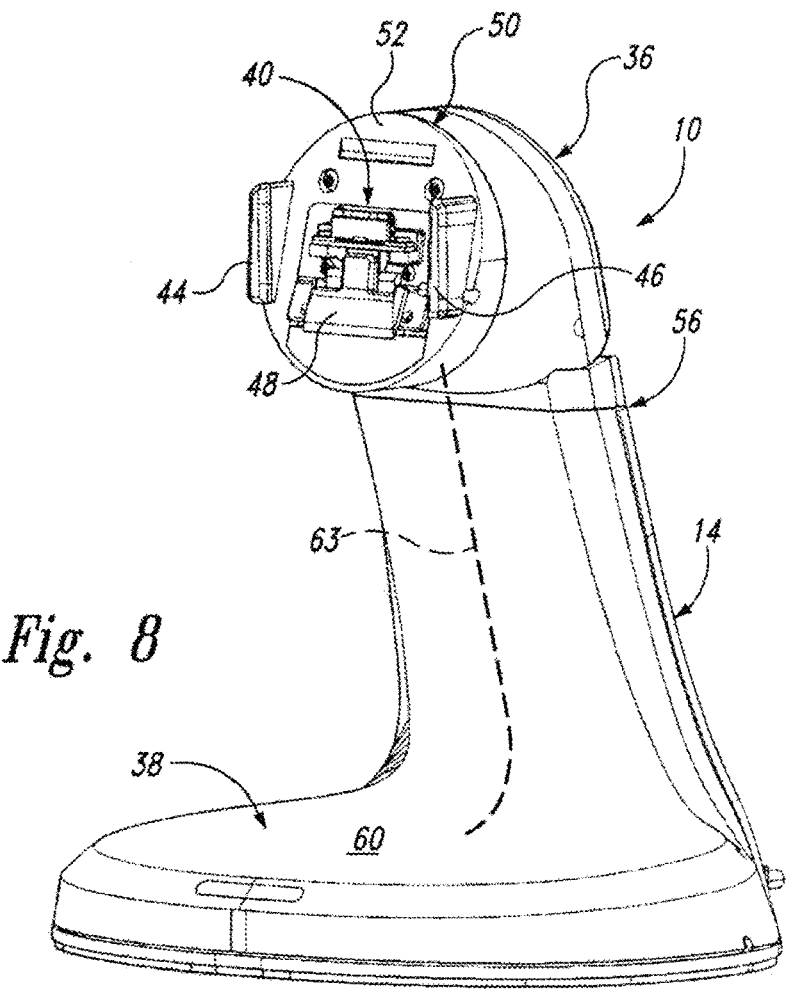
FIG. 8 is a perspective view of a pedestal portion of the docking station illustrated in FIG. 1.

Referring now to FIG. 8, reference numeral 14 generally indicates the pedestal portion of the docking station 10. The pedestal portion includes an upper head portion, indicated generally at 36, and a lower base portion, indicated generally at 38. The head portion 36 carries a second universal adaptor 40 that connects into a similar connector fitting in a recess of 42 of the first adaptor 24.

The first adaptor 24 releasably rests on protrusions 44, 46 on head portion 36. It has a conventional catch 48 that allows adaptor 24 (and therefore, frame 12) to be releasably connected to and from the pedestal portion 14 (via the head 36).

An advantage to the design is that the portion fitting 40 adjacent the front face 52 of head portion 36 creates a reliable interface connection point for engagement/disengagement of the first universal adaptor 24 (and frame portion 12) with the pedestal portion 14.

Figure 9:
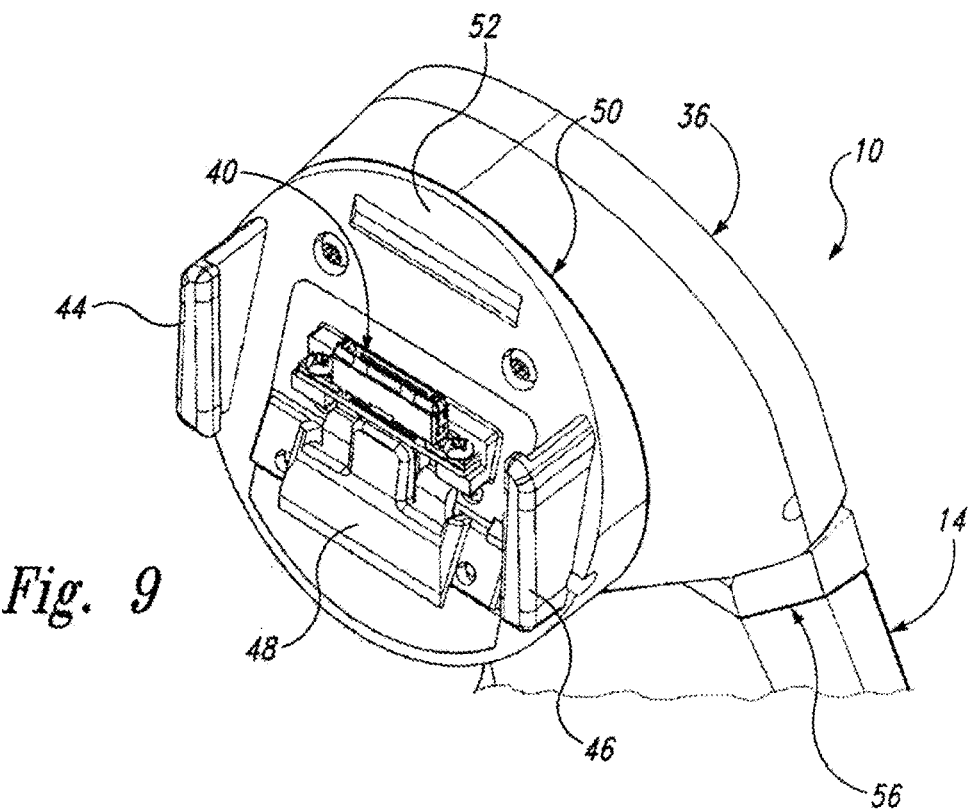
FIG. 9 is an enlarged view of the head of the pedestal portion illustrated in FIG. 8.

The head portion 36 is designed to rotate at three physical positions. The first position is indicated by arrow 50 in FIG. 9, which illustrates a circular rotation of the front face 52 of the head portion about an axis that would project normally out from face 52. When the frame portion 12 is mounted to the pedestal 14, this arrangement provides one degree of freedom of rotation that would allow the tablet 16 to be rotated between portrait and landscape orientations, if desired. Arrow 54 in FIG. 10 points to another area designed to allow the head 36 to rotate up or down to rotationally lift or lower the screen of the tablet for vertical positioning, as desired.

Finally, arrow 56 points to a last position for angularly rotating the head about a vertical or upright axis for angularly adjusting the tablet screen 16 from left-to-right, as desired.

Figure 12:
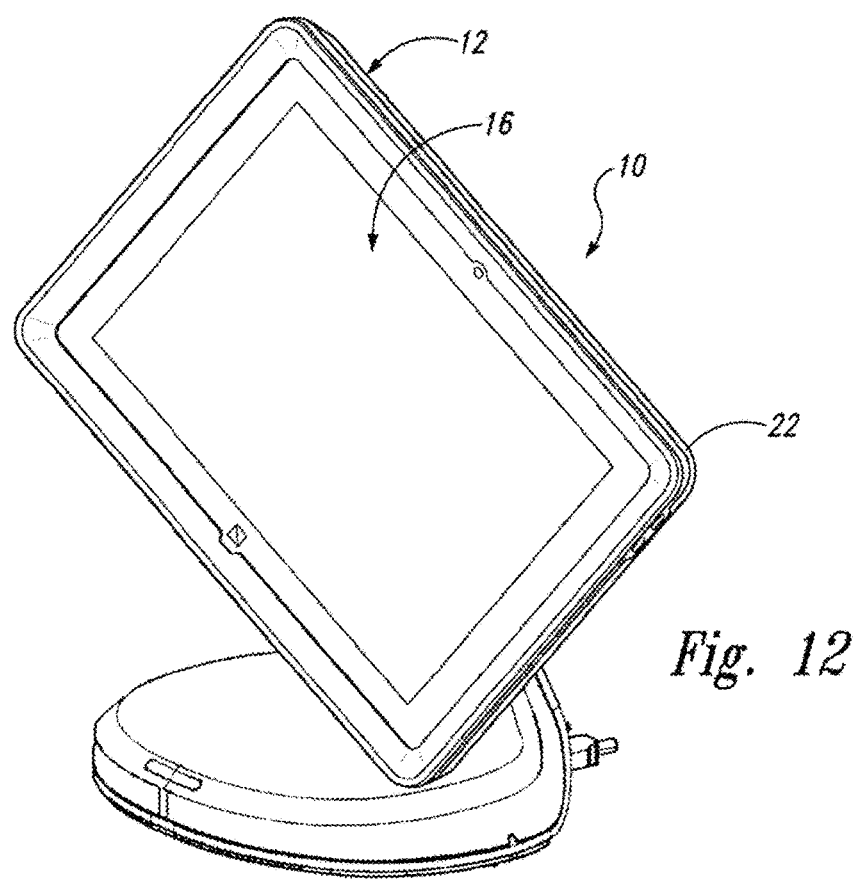
FIG. 12 is a perspective view of the docking station, showing angular rotation of the tablet device.
Figure 13:
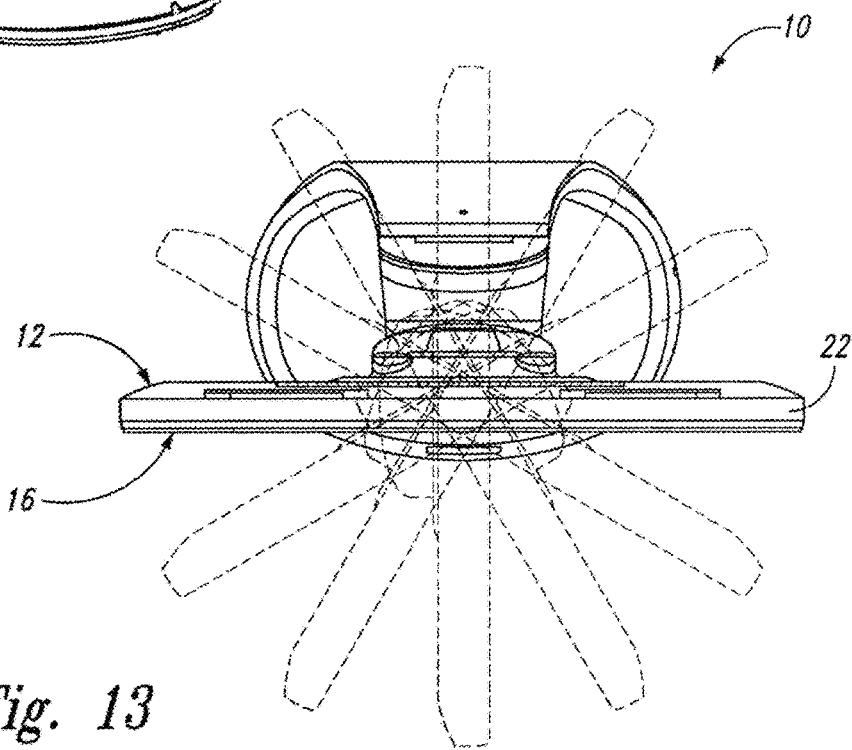
FIG. 13 is a top view of FIG. 12 and shows different rotational positions of the tablet device.

The physical structure of the above rotational connections can take different forms, using different types of pins or moldings that allow one part to rotate relative to another. In all cases, what is important about the design is that it allows three degrees of rotation without interfering with the wiring in the pedestal portion. FIGS. 12 and 13 illustrate different possible rotational positions.

Figure 11:
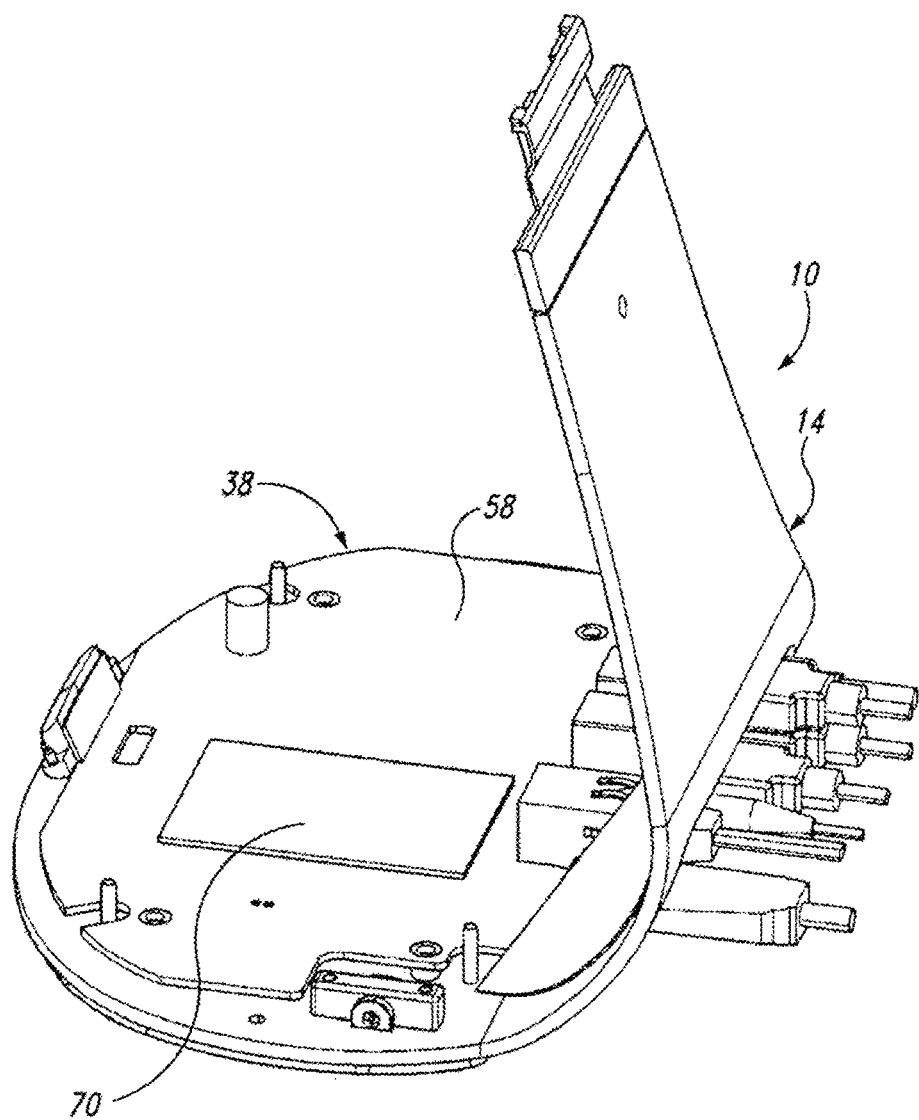
FIG. 11 is a view of the lower portion of the pedestal portion illustrated in FIG. 8, with a cover removed to reveal an electronics board.

In this last respect, FIG. 11 illustrates base portion 38 with its cover plate 60 removed, thus exposing an electronics control board (ECB) 58 inside the base portion. A series of electrical connector fittings (USB, etc.) are electrically connected to the ECB 58 for providing data or power. These electrical signals are passed, via wiring, or a wiring harness, up through the body of the pedestal 14, which is hollow. The position of the wiring is schematically indicated by dashed line 63 in FIG. 8.

Figure 10:
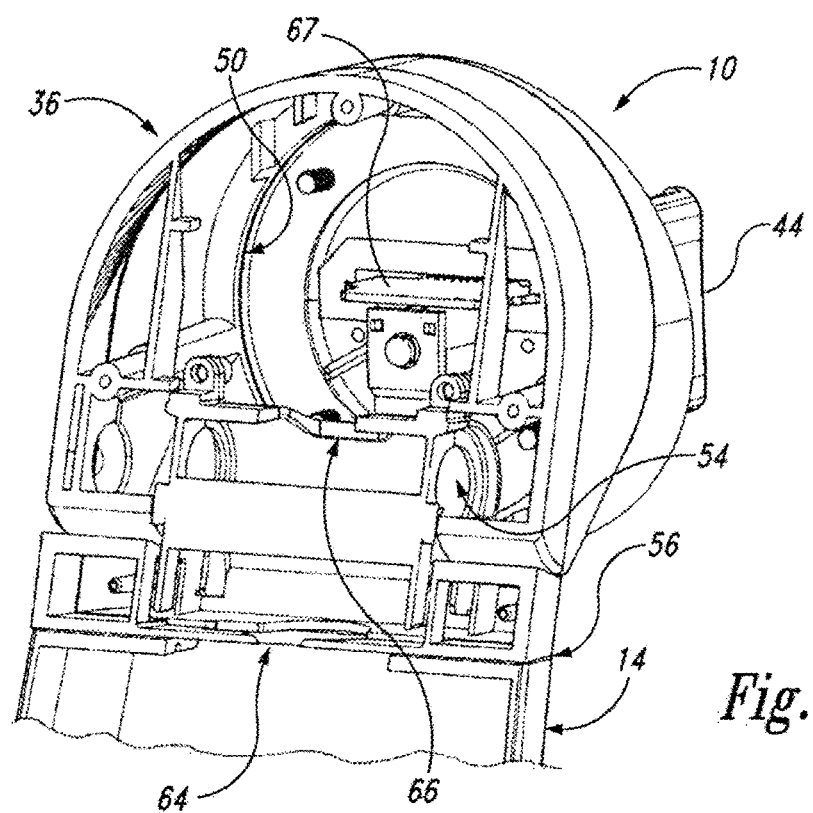
FIG. 10 is a view like FIG. 9, but is taken from the back-side perspective of the pedestal portion.

Referring to FIG. 10, the pedestal 14 has openings 64, 66 that enable the wiring to pass through the head space, and through the physical zone of rotational connections described above. This allows rotation without stressing the wiring. The wiring connects to a board 67 upon which the second adaptor fitting 40 rests. The board 67 provides the wiring connections to the fitting 40.

Finally, the frame portion 12 could be releasably locked to the pedestal portion via a RFID lock if desired. The ECB 58 in the base portion has surface space for a RFID sensor 70 that could detect a wireless keycard, if desired. The sensor would activate locks on the head portion, upon detection of the keycard.

It is to be appreciated that the foregoing description sets forth the best known examples and embodiments. It is not intended that any of the foregoing description be used to limit the scope of the patent protection. Instead, all patent protection is to be defined solely by the patent claim or claims that follow this description, the interpretation of which is to be made according to the legal rules of patent claim interpretation and the rules and regulations of the U.S. Patent and Trademark Office.

What is claimed is:

1. A docking station for a tablet device, the docking station comprising:
   a frame assembly for retaining and electronically connecting with the tablet device, the frame assembly including a first interface; and a pedestal assembly including a head portion and a base portion, the head portion being connected to the base portion, the head portion including a second interface;

wherein the frame assembly is releasably dockable with respect to the pedestal assembly via connectability of the first interface with the second interface;

wherein the first interface includes a first electrical interface, and wherein the second interface includes a second electrical interface;

wherein the first and second electrical interfaces are configured such that the pedestal assembly and the frame assembly are electrically connected whenever the first interface is connected to the second interface to define a docked position for the frame assembly with respect to the pedestal assembly;

wherein the first and second electrical interfaces are configured such that the pedestal assembly is electrically unconnected to the frame assembly whenever the first interface is not connected to the second interface;

the frame assembly being positionable relative to the base portion of the pedestal assembly in a docked landscape orientation and in a docked portrait orientation;

the pedestal assembly and the frame assembly being configured such that the first and second electrical interfaces are electrically connected to each other when the frame assembly is in the docked landscape orientation to define a path for (1) transmitting power to the tablet device via the first and second interfaces from a power source that supplies power to the pedestal assembly, and (2) communicating data between the tablet device and the pedestal assembly via the first and second interfaces; and the pedestal assembly and the frame assembly being configured such that the first and second electrical interfaces are electrically connected to each other when the frame assembly is in the docked portrait orientation to define a path for (1) transmitting power to the tablet device via the first and second electrical interfaces from the power source that supplies power to the pedestal assembly, and (2) communicating data between the tablet device and the pedestal assembly via the first and second electrical interfaces.

2. The docking station as set forth in claim 1 wherein the docking station further comprises a lock assembly moveable between a locked condition and an unlocked condition, the lock assembly being configured to lock the frame assembly to the pedestal assembly when the lock assembly is in the locked condition, the lock assembly being configured to permit undocking of the frame assembly from the pedestal assembly when the lock assembly is in the unlocked condition.

3. The docking station as set forth in claim 2 wherein the lock assembly comprises a sensor configured to receive a wireless signal, the lock assembly being configured to move from the locked condition to the unlocked condition upon the sensor receiving the wireless signal.

4. The docking station as set forth in claim 3 wherein the sensor is configured to receive an RFID signal.

5. The docking station as set forth in claim 4 wherein the sensor is configured to receive the RFID signal from a wireless keycard.

6. The docking station as set forth in claim 1 wherein the head portion of the pedestal assembly is configured to pivot about a horizontal axis to adjust a vertical position of the frame assembly when the first interface is connected to the second interface.

7. The docking station as set forth in claim 1 wherein the head portion further comprises a face, the head portion having a head portion axis, the head portion axis being generally normal to the face, the frame assembly being generally normal to the head portion axis when in the docked landscape orientation, the frame assembly being generally normal to the head portion axis when in the docked portrait orientation.

8. The docking station as set forth in claim 1 wherein the head portion is configured such that the frame assembly is rotatable relative to the base portion of the pedestal assembly between the docked landscape orientation and the docked portrait orientation while the first interface is connected to the second interface.

9. The docking station as set forth in claim 1 wherein the first interface is electrically connectable to the tablet device and the second electrical interface.

10. The docking station as set forth in claim 9 wherein the first interface comprises a frame adapter.

11. The docking station as set forth in claim 10 wherein the frame adapter comprises a universal adapter that is electrically coupleable to a plurality of different kinds of connection ports on different types of tablet devices.

12. The docking station of claim 10 wherein the second interface comprises a pedestal adapter.

13. The docking station as set forth in claim 1 wherein the first and second interfaces are configured such that the first and second electrical interfaces are electrically connected via conductive pathways for power and data transfer whenever the first interface is connected to the second interface.

14. The docking station as set forth in claim 1 wherein the path for communicating data between the tablet device and the pedestal assembly via the first and second electrical interfaces provides for bidirectional data flow through the first and second electrical interfaces.

15. The docking station as set forth in claim 1 further comprising the tablet device.

16. A docking station for a tablet device, comprising:

a frame assembly for retaining the tablet device, the frame assembly comprising a first interface for electrically coupling to the tablet device, the first interface being electrically coupleable to a plurality of different types of tablet devices; and a pedestal assembly for releasably physically and electrically connecting the frame assembly to the pedestal assembly;

wherein the releasable physical connectability is provided via a locking structure disposed on the pedestal assembly to allow the frame assembly to be removed from the pedestal assembly via an associated unlock feature; and wherein the releasable electrical connectability is provided via a second interface disposed on the pedestal assembly, wherein the second interface provides a detachable connection point for electrically coupling the pedestal assembly to the frame assembly via the first interface and defining a path for power and data transfer with respect to the tablet device through the first interface.

17. The docking station as set forth in claim 16 wherein the path for data transfer comprises a bidirectional data transfer path.

18. The docking station as set forth in claim 16, wherein the unlock feature comprises a wireless unlock feature.

19. The docking station as set forth in claim 17, wherein the wireless unlock feature comprises a radio frequency identification (RFID) unlock feature.

20. The docking station as set forth in claim 17, wherein the wireless unlock feature comprises a sensor operable to detect a wireless key and activate the locking structure upon detection of the wireless key to allow the frame assembly to be removed from the pedestal assembly.

* * * * *